US008181608B2

(12) United States Patent
Reese

(10) Patent No.: US 8,181,608 B2
(45) Date of Patent: May 22, 2012

(54) LEG-ATTACHED ANIMAL MANAGEMENT DEVICE

(76) Inventor: David Reese, Chicago, IL (US)

( * ) Notice: Subject to any disclaimer, the term of this patent is extended or adjusted under 35 U.S.C. 154(b) by 139 days.

(21) Appl. No.: 12/705,772

(22) Filed: Feb. 15, 2010

(65) Prior Publication Data

US 2011/0197824 A1    Aug. 18, 2011

(51) Int. Cl.
*A01K 27/00* (2006.01)

(52) U.S. Cl. .......................... 119/720; 119/858

(58) Field of Classification Search .............. 119/720, 119/792, 905, 856, 858, 859; 54/82
See application file for complete search history.

(56) References Cited

U.S. PATENT DOCUMENTS

| | | | | |
|---|---|---|---|---|
| 3,747,565 A | * | 7/1973 | Kellam | 54/82 |
| 4,099,269 A | * | 7/1978 | Porner | 2/16 |
| 4,114,352 A | * | 9/1978 | Horton et al. | 54/79.1 |
| 4,688,572 A | * | 8/1987 | Hubbard et al. | 607/112 |
| 5,076,043 A | * | 12/1991 | Butler | 119/850 |
| 5,152,285 A | * | 10/1992 | Gnegy | 607/108 |
| 5,158,039 A | * | 10/1992 | Clark | 119/712 |
| 5,341,765 A | * | 8/1994 | McComb | 119/850 |
| D352,369 S | * | 11/1994 | Figoni | D30/144 |
| 5,632,235 A | * | 5/1997 | Larsen et al. | 119/856 |
| 5,644,902 A | * | 7/1997 | Kemp | 54/37.1 |
| 5,887,772 A | * | 3/1999 | Dooley | 224/191 |
| D407,865 S | * | 4/1999 | Rylander | D30/144 |
| 5,910,126 A | * | 6/1999 | Wilson et al. | 602/75 |
| 6,155,546 A | * | 12/2000 | Whitener | 269/3 |
| 6,427,374 B1 | * | 8/2002 | Vaiani | 42/85 |
| 6,443,101 B1 | * | 9/2002 | Fazio | 119/792 |
| 6,564,753 B1 | * | 5/2003 | Heileg et al. | 119/850 |
| 6,571,745 B2 | * | 6/2003 | Kerrigan | 119/858 |
| 6,883,466 B1 | * | 4/2005 | Chambers | 119/850 |
| 7,497,186 B2 | * | 3/2009 | Dorton et al. | 119/72 |
| 7,739,748 B2 | * | 6/2010 | Nilforushan et al. | 2/69 |
| 7,918,192 B1 | * | 4/2011 | Digh et al. | 119/850 |
| 2002/0043218 A1 | * | 4/2002 | Butler | 119/792 |
| 2007/0204803 A1 | * | 9/2007 | Ramsay | 119/720 |
| 2010/0043725 A1 | * | 2/2010 | Hall | 119/850 |

* cited by examiner

*Primary Examiner* — Yvonne Abbott
(74) *Attorney, Agent, or Firm* — Clifford Kraft

(57) ABSTRACT

A leg-mounted pouch and coil-up leash that allows hands-free managing of a dog or other animal. A leg pouch can contain a bottom opening through which the leash can be threaded to the animal or a removable leash coil otherwise attached or a separate leg brace removable from the pouch can hold the leash coil. This allows the wearer to control the animal without having to take the hands or eyes off of a weapon or other equipment or stop to change hand or arm positions. In some embodiments, there is a water bottle that can supply liquid to the animal. Also, in other embodiments, a remote-controlled release can free the dog wirelessly for an attack or other purpose. A preferred embodiment can separate into four parts, a leg-worn pouch or pouches, a belt or leg-worn attachment that holds a coil-up leash, a separable water bottle with a delivery hose, and an animal collar with a wirelessly controlled release.

18 Claims, 10 Drawing Sheets

PRIOR ART

PRIOR ART

LEG-ATTACHED ANIMAL MANAGEMENT DEVICE

FIELD OF THE INVENTION

The present invention relates to devices for managing dogs and other animals and more particularly to a leg-attached device for managing and sustaining a dog.

DESCRIPTION OF THE PRIOR ART

It is known in the art to manage an animal such as a dog with a leash. It is very common for dog owners to use a spring-loaded coil-up leash that has a trigger release and lock. With this type of leash, a dog owner can let a dog run out leash to a controlled amount.

Animals, especially dogs, are used by police and military to search for explosives and contraband because of their exceptional ability to smell and the ease of training certain breeds for this work.

A soldier or policeman may have to carry a weapon in addition to other equipment while managing a dog, and the weapon may require that both hands be used. It would be advantageous to have a way that a handler with a rifle or other equipment requiring two arms and hands could also control a dog with a coil-up leash. It would also be extremely advantageous of the same device could supply water for the animal, and in some cases, release the animal by remote command so that it might attack on command.

SUMMARY OF THE INVENTION

The present invention relates to a leg-mounted pouch and coil-up leash that allows hands-free managing of a dog or other animal. A leg pouch can contain a bottom opening through which the leash can be threaded to the animal or a removable leash coil otherwise attached or a separate leg brace removable from the pouch can hold the leash coil. This allows the wearer to control the animal without having to take the hands or eyes off of a weapon or other equipment or stop to change hand or arm positions. In some embodiments, there is a water bottle that can supply liquid to the animal. Also, in other embodiments, a remote-controlled release can free the dog wirelessly for an attack or other purpose. A preferred embodiment can separate into four parts, a leg-worn pouch or pouches, a belt or leg-worn attachment that holds a coil-up leash, a separable water bottle with a delivery hose, and an animal collar with a wirelessly controlled release.

DESCRIPTION OF THE FIGURES

Attention is now directed to several drawings that illustrate features of the present invention.

Several drawings and illustrations have been presented to aid in understanding the present invention. The scope of the present invention is not limited to what is shown in the figures.

DESCRIPTION OF THE INVENTION

The present invention relates to a leg-mounted holder and coil-up leash that allows hands-free managing of a dog or other animal including supplying the animal with water, and an optional radio-controlled release mechanism for the animal.

Figure 1:
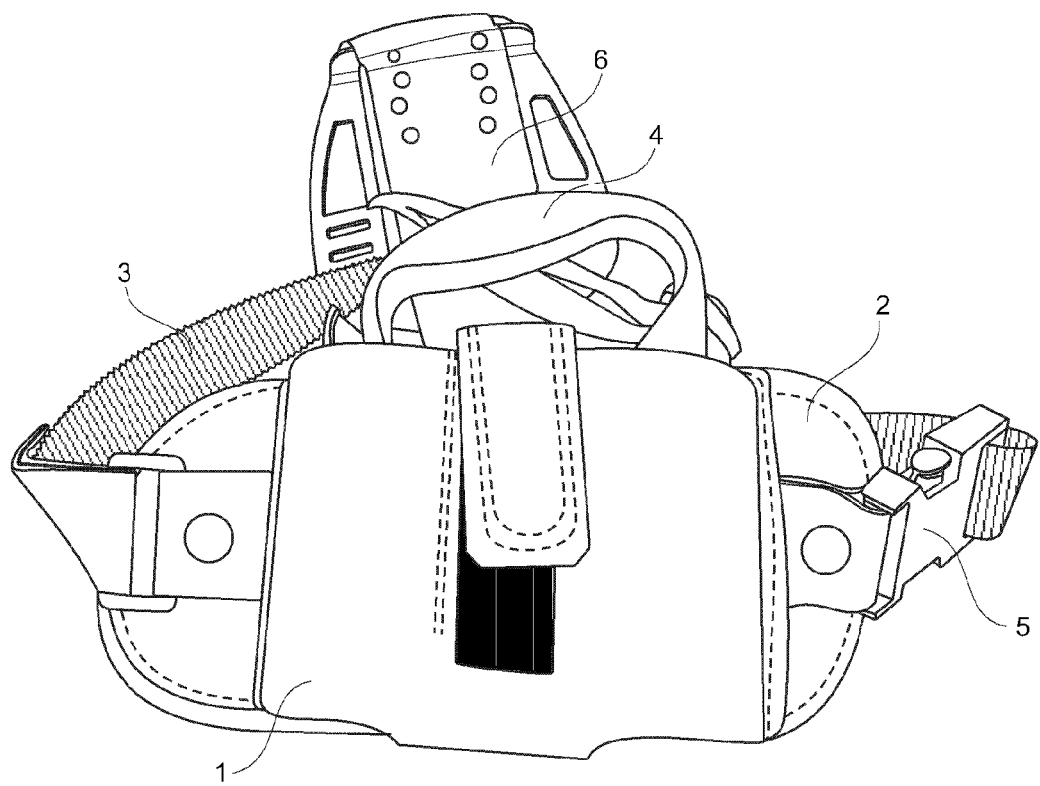
FIG. 1 shows a front view of a first embodiment containing the coil-up leash.

FIG. 1 shows a front view of an embodiment of the present invention which can be strapped on one leg of the human operator. A pouch 1 is similar to the top part of a standard gun holster with at least one opening in the bottom. A strap 3 allows a support 2 to hug the thigh. A belt couple 6 can be put over the wearer's belt to hold the device vertically. The device can be buckled and released with a snap-release 5. A removable coil-up leash 4 can be placed in the pouch 1.

Figure 2:
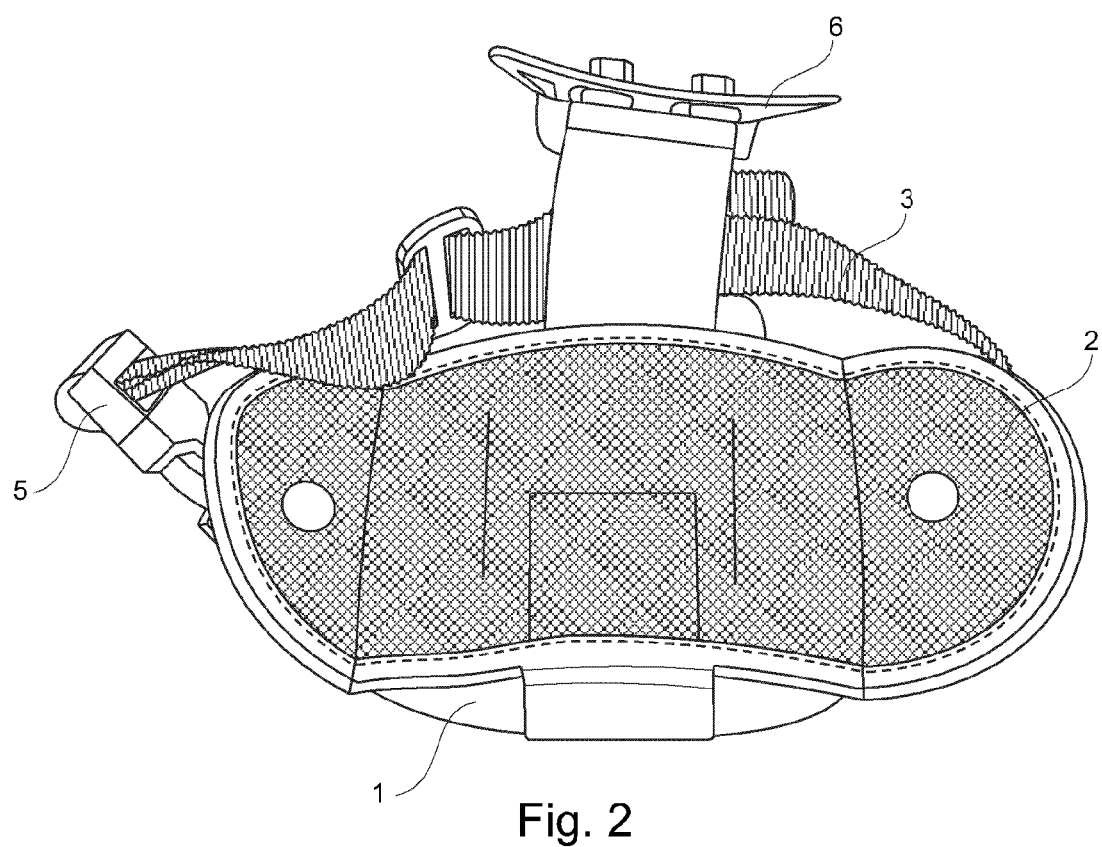
FIG. 2 shows a back view of the embodiment of FIG. 1
Figure 3:
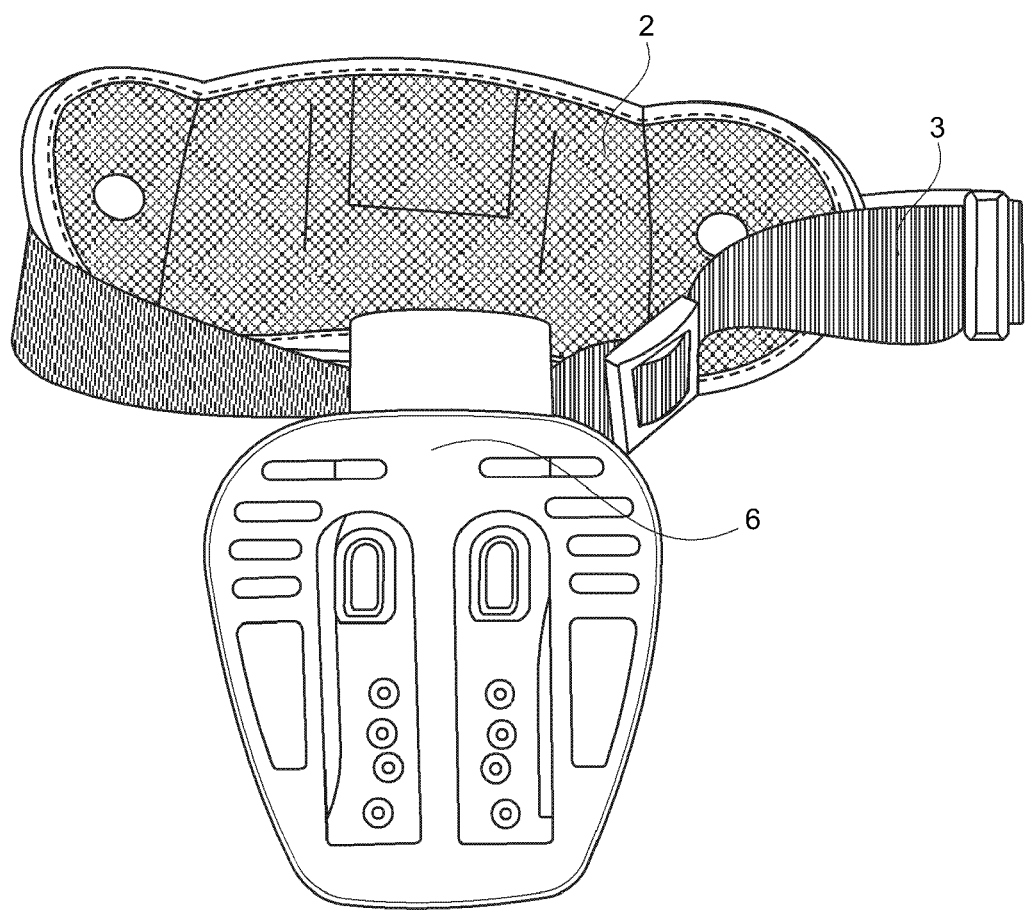
FIG. 3 shows another back view.

FIG. 2 shows a back view of the embodiment of FIG. 1 with the belt couple 6 pulled up out of the way. The inner support 2, strap 3 and snap-release 5 can be seen. FIG. 3 is a similar view to that of FIG. 2, except that the belt couple 6 has been pulled down.

Figure 4:
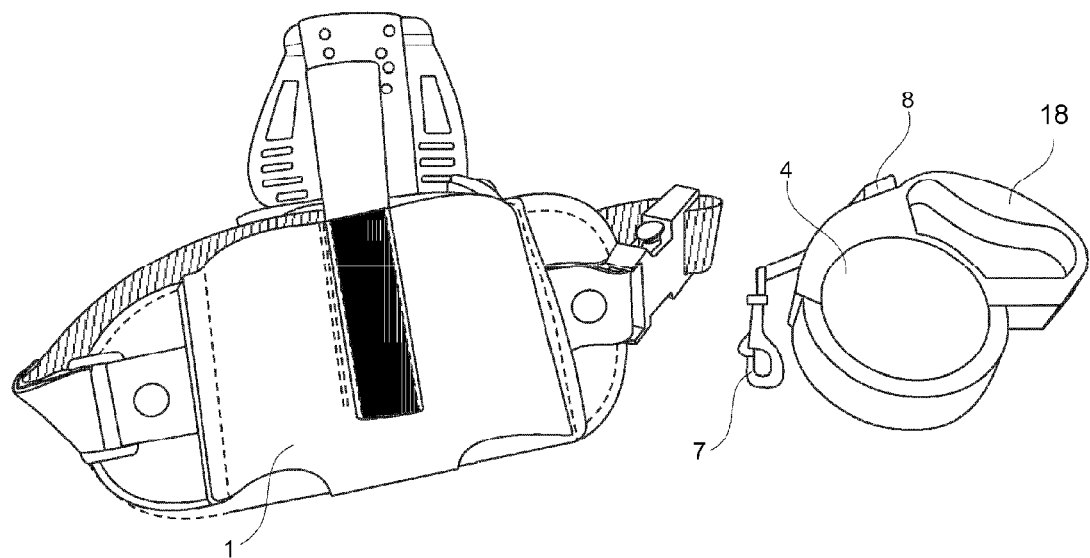
FIG. 4 shows the coil-up leash removed from the device.
Figure 5:
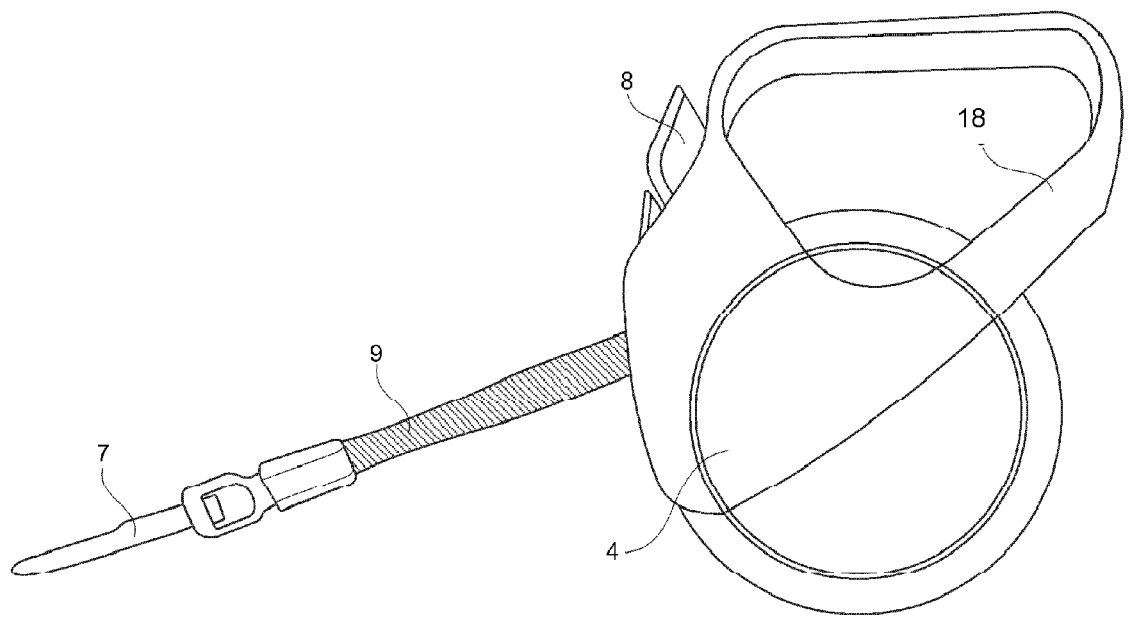
FIG. 5 shows a prior art coil up leash.

FIG. 4 shows the pouch device 1 with the coil-up leash 4 removed. The leash 4, a device known in the art, has a handle 18, a release button 8 that allows the animal to take out leash and a hook 7 that can attach to the animal's collar. This prior art device can be seen more clearly in FIG. 5.

Figure 6:
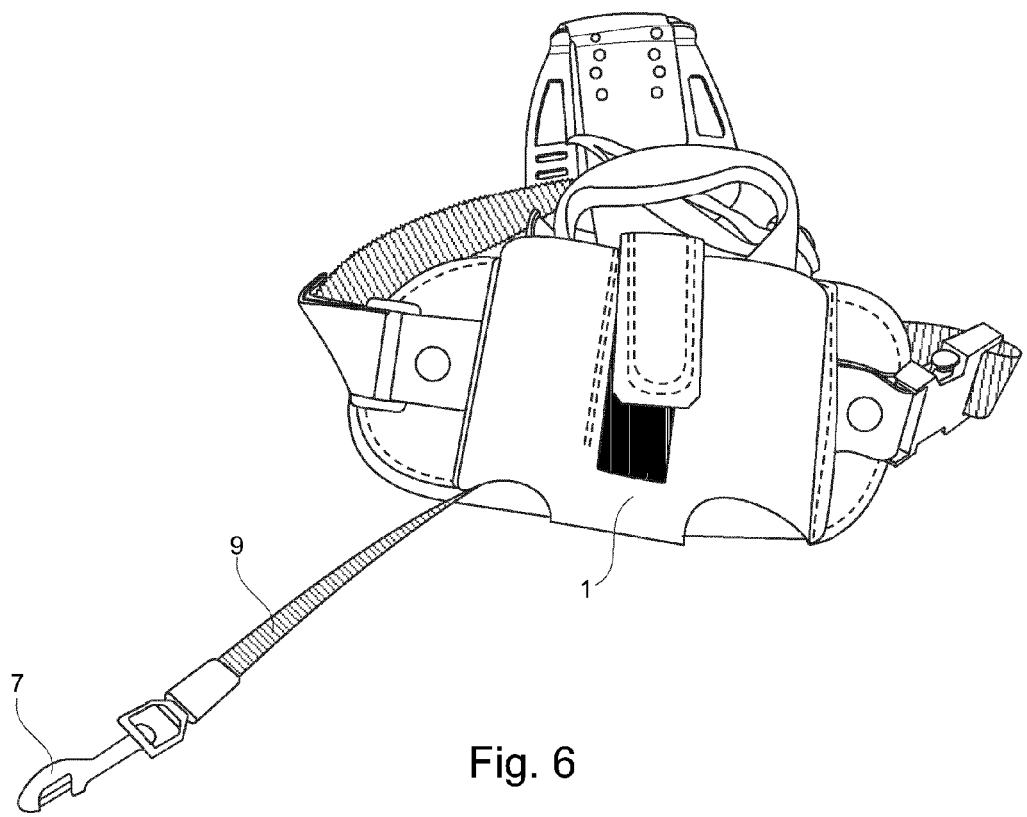
FIG. 6 shows the leash threaded out the bottom of the holster.

FIG. 6 shows the device with the coil-up leash in the pouch 1 with part of the leash 9 run out as it would be in normal service with an animal such as a dog on the leash. The leash coil has a spring, so that when the button 8 is pushed, the animal can take out more leash. Using the present invention, a soldier or policeman has both hands free while still managing the animal.

Figure 7:
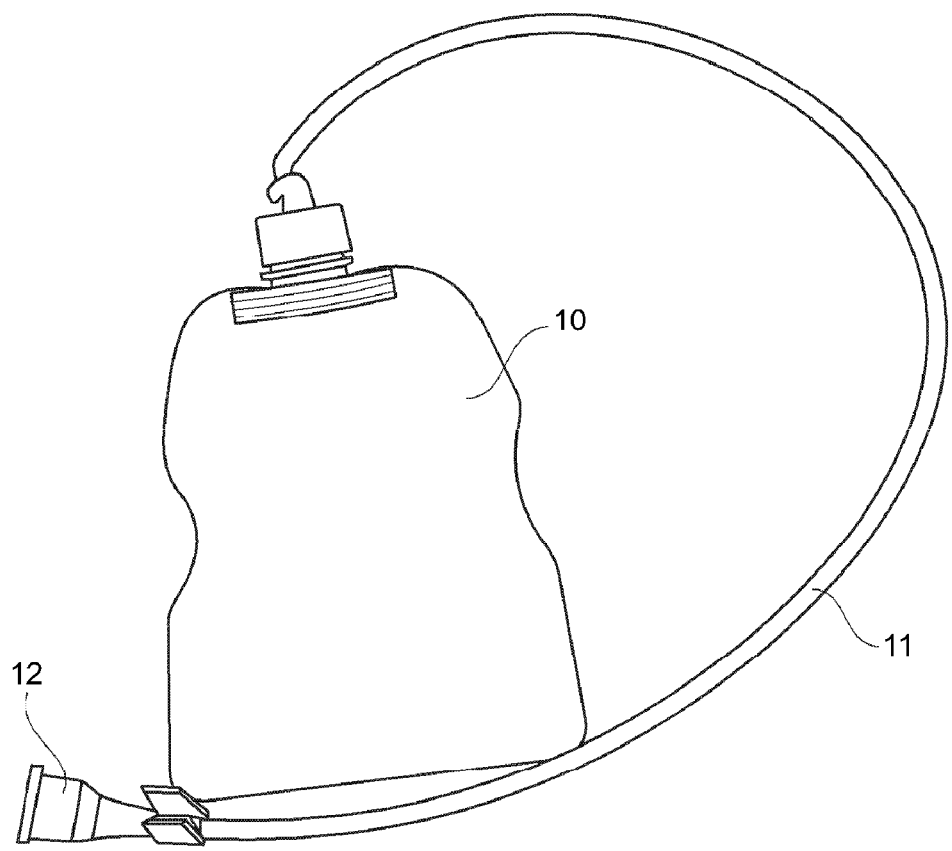
FIG. 7 shows a prior art water bottle.

FIG. 7 shows a prior art water bottle 10 with a delivery tube 11 and a clipable feed point 12. This bottle can be used to hold water for an animal when it is incorporated into the other parts of the present invention. Normally the water bottle 10 is removable for filling or for use of the pouch 1 without it.

Figure 8:
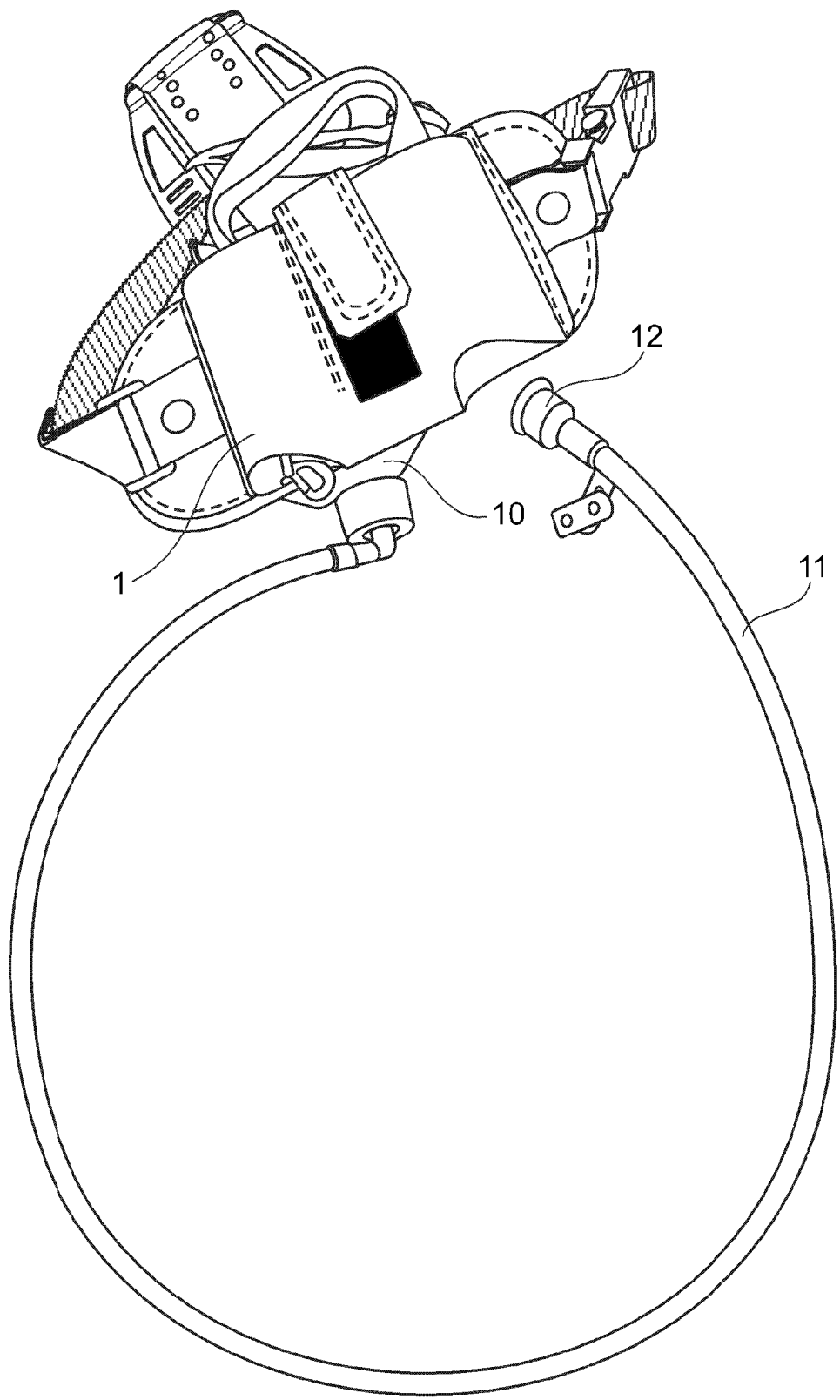
FIG. 8 shows the water bottle combined with the holster and leash.

FIG. 8 shows the knee mounted pouch 1 previously described with the water bottle 10 attached or otherwise incorporated. The delivery tube 11 can be coiled up into the device when not in use. Using this embodiment of the present invention, a dog-handler can be assured of having a supply of fresh drinking water for the animal while in the field.

Figure 9:
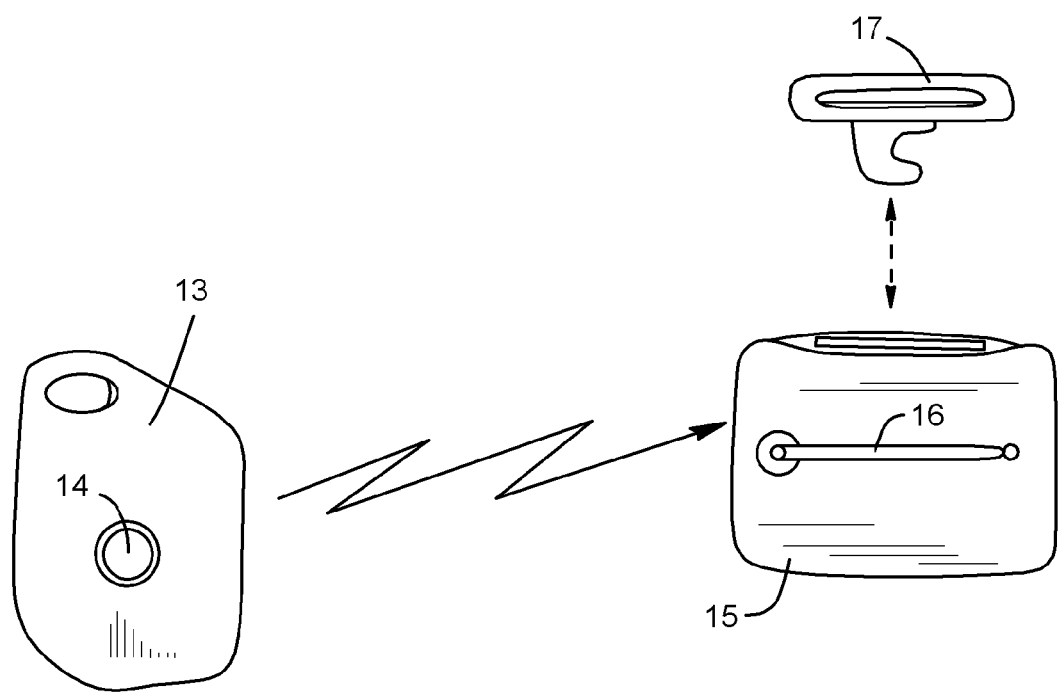
FIG. 9 shows a key-fob radio release mechanism for the leash.

FIG. 9 shows an embodiment of a wireless animal release. A key-fob 13, or other transmitter device can send a wireless signal to a leash holder 15 that can have a radio antenna 16 if radio is used. While any wireless technique is within the scope of the present invention including light and sound, radio is the preferred wireless technique. A system similar to BLUETOOTH can be used. A wireless signal from the key-fob or transmitter 13 is sent by pushing the button 14. The wireless signal is received by the leash holder 15 causing the leash attachment 17 to fall loose. This immediately allows the animal to be freed to carry out a command such as a command to attack. The use of a key-fob 13, is for illustration only; any wireless transmitter in any configuration can be used including one that does not require much movement of the hands or arms. This allows a soldier, for example, to release a dog for attack or other free maneuver without having to change the position of a weapon being held at ready. Normally, a digital coded signal can be used so that spurious radio signals or ambient noise does not release the leash. A coded signal is also useful when more than one animal handler is working in a nearby area. This prevents a signal from one user from releasing another's animal.

Figure 10:
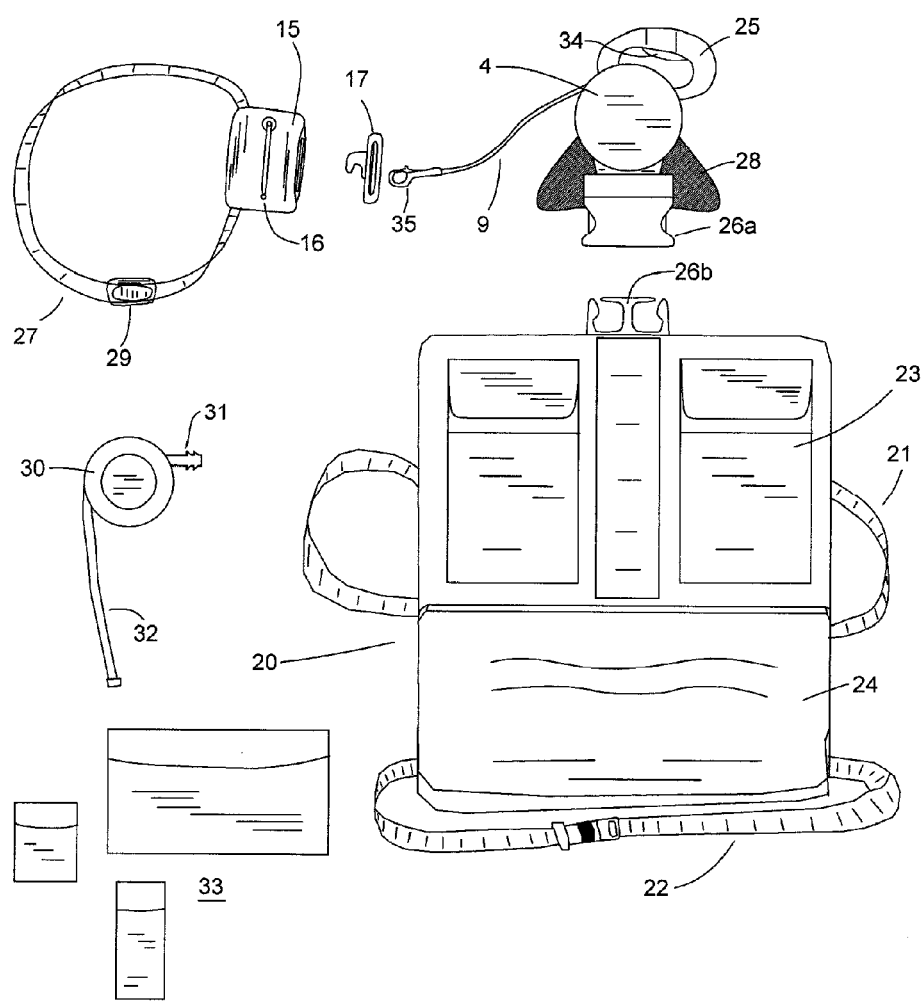
FIG. 10 shows another embodiment with separable parts.

FIG. 10 shows a different embodiment of the present invention. In this embodiment, the major parts are separable. A flexible pouch 20 can be strapped to the leg with one or two straps 21, 22. Optionally, the bottom part of this pouch 20 can contain one or more large pockets 24 that can hold a plurality of smaller, totally removable pouches 33. The upper part of the flexible pouch 20 can be equipped with more pockets 23 that can further old small pouches or supplies.

A holster type brace 28 can be detachable from the flexible pouch 20 with a quick-release snap 26a, 26b known in the art. An animal leash coil 4 with handle 25 can be attached to the brace 28. Optionally, the leash coil 4 can be attached to the flexible pouch 20 or be carried in a pocket in the flexible pouch 20. The leash coil 4 has an extendable leash cord 9 controllable from the handle 25 with a release trigger 34. This allows the dog to take out more leash if desired. The leash cord 9 can terminate in a snap-release 35 that can snap connect to release attachment 17.

Since the brace 28 and the pouch 20 are separable, they can be used either together or separately. The brace 28 can be used when it is desired to just manage the dog, but not carry water or other supplies. The pouch 28 can be worn separately to provide pockets, or can be used attached to the brace 28.

The release attachment 17 snaps into a leash holder 15 as previously described and shown in FIG. 9. The leash holder 15 can be attached to a collar 27 with an adjustment 29 that fits around the animal's neck, or is otherwise temporarily attached to the dog or other animal. As shown in FIG. 9, and previously described, the leash holder 15 can be wirelessly controlled having an optional antenna 16 that can receive a release signal from a small transmitter.

The embodiment of FIG. 10 can also have an optional roll-up water supply hose 30, 32 for the animal that can attach to a water bottle (shown in FIGS. 7-8) with a connector 31.

The pouch parts of the present invention can be made from canvas or other flexible heavy cloth-like material, while the rigid parts are preferably made from hard plastic. Metal and other cloths can also be used advantageously to construct the parts of the present invention. Any suitable materials are within the scope of the invention.

While any animal can be managed using the devices and techniques of the present invention, the preferred animal is a dog since dogs are usually the best choice of animal for field work including searching for explosives and contraband, as well as patrolling and attack if necessary.

Several descriptions and illustrations have been presented to aid in understanding the present invention. One skilled in the art will realize that numerous changes and variations are possible without departing from the spirit of the invention. Each of these changes and variations is within the scope of the present invention.

I claim:

1. A hands-free animal management system comprising:
   a leg-mounted pouch device including at least one pocket, said pouch adapted to hold a coil-up animal leash, said animal leash attachable to an animal's collar;
   a leg-mounted attachment member;
   wherein, said leg-mounted pouch and said leg-mounted attachment member snap together with a quick-release snap;
   an animal collar attached to a release attachment adapted to be connected to said animal leash;
   wherein, upon a wireless command, said release attachment can release said animal collar.

2. The hands-free animal management system of claim 1 further comprising at least one strap adapted to pass around a wearer's leg.

3. The hands-free animal management system of claim 1 further comprising an integral water bottle with delivery tube for supplying fresh water to said animal.

4. The hands-free animal management system of claim 1 further comprising a wireless receiver worn in proximity to said animal's collar that can release said collar upon said wireless command.

5. The hands-free animal management system of claim 1 further comprising a wireless transmitter adapted to send said wireless command.

6. The hands-free animal management system of claim 1 wherein said wireless command is transmitted by radio.

7. The hands-free animal management system of claim 1 wherein said wireless command is a coded digital command.

8. A field-adapted animal management system comprising:
   a leg-mounted pouch, said pouch having at least one pocket;
   a belt or leg-mounted attachment containing a coil-up animal leash;
   wherein, said leg-mounted pouch and said leg-mounted attachment snap together with a quick-release snap;
   a water bottle integral with said pouch, said water bottle having a delivery tube adapted to deliver water to an animal;
   an animal collar attached to a release attachment adapted to be connected to said animal leash;
   wherein, upon a wireless command, said release attachment can release said animal collar.

9. The field-adapted animal management system of claim 8 further comprising a wireless receiver attached to said animal collar that releases said leash upon receipt of a coded wireless command from a transmitter.

10. The field-adapted animal management system of claim 9 wherein said wireless command is sent by radio.

11. The field-adapted animal management system of claim 10 wherein said wireless command is sent by BLUETOOTH.

12. The field-adapted animal management system of claim 8 wherein said water bottle is removable from said pouch.

13. An animal handling system comprising:
    a leg-mounted pouch, said pouch having at least one pocket;
    a belt or leg-mounted attachment containing a coil-up animal leash;
    wherein, said leg-mounted pouch and said leg-mounted attachment snap together with a quick-release snap;
    an animal collar attached to a release attachment adapted to be connected to said animal leash;
    wherein, upon a wireless command, said release attachment can release said animal collar.

14. The animal handling system of claim 13 further comprising a water bottle integral with said pouch, said water bottle having a delivery tube adapted to deliver water to an animal.

15. The animal handling system of claim 13 wherein said wireless command is digitally coded.

16. The animal handling system of claim 13 wherein said wireless signal is transmitted by BLUETOOTH.

17. The animal handling system of claim 14 wherein said water bottle includes a coiled delivery tube.

18. The animal handling system of claim 13 wherein said wireless command is delivered from a wireless transmitter in proximity to said belt or leg-mounted attachment.

* * * * *